Sept. 27, 1960    D. J. JONES ET AL    2,954,444
INTERLOCK MECHANISM FOR AN ENCLOSED ELECTRIC SWITCH
Filed Sept. 9, 1958    2 Sheets-Sheet 1
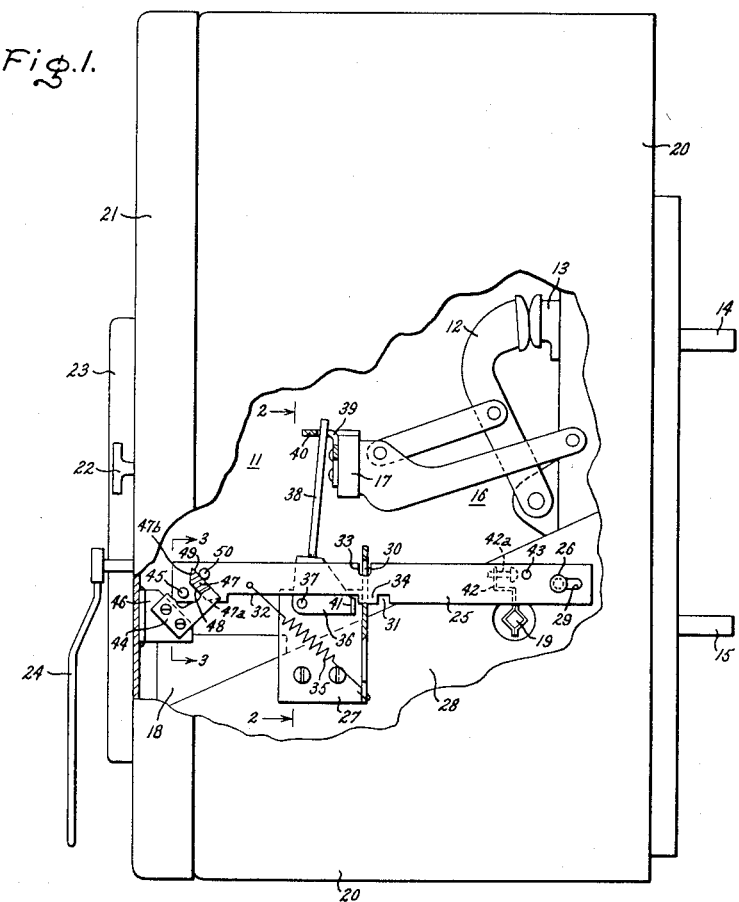
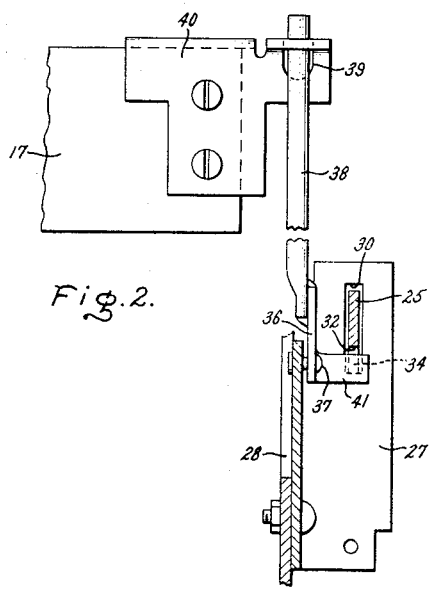
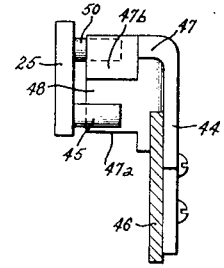
Inventors:
Daniel J. Jones,
Dante E. Piccone,
by Irving H. Marshman
Their Attorney.

Sept. 27, 1960  D. J. JONES ET AL  2,954,444
INTERLOCK MECHANISM FOR AN ENCLOSED ELECTRIC SWITCH
Filed Sept. 9, 1958  2 Sheets-Sheet 2
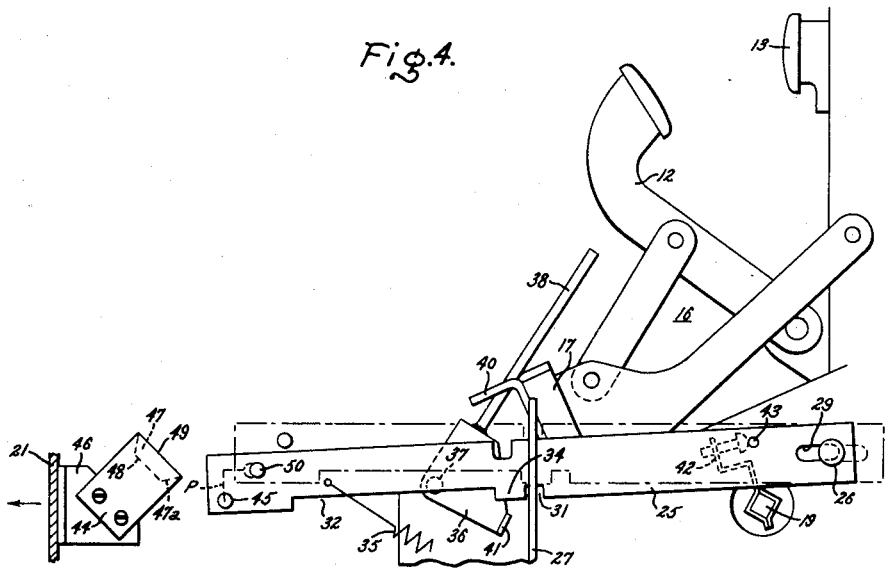
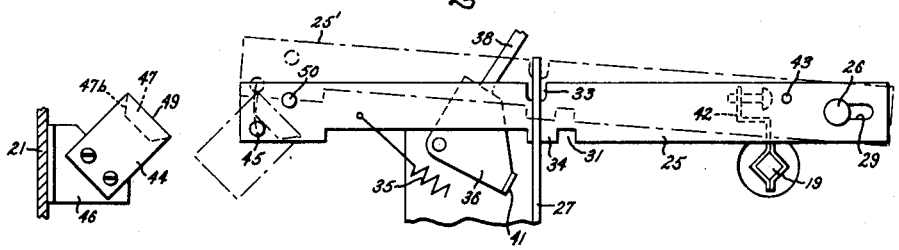
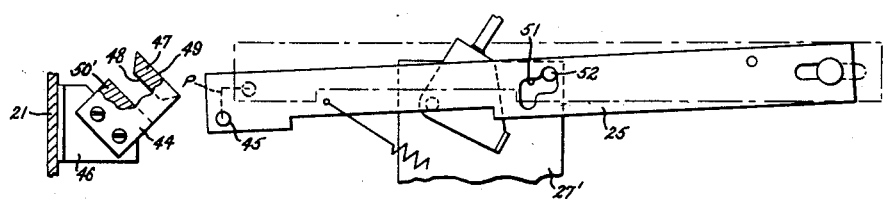
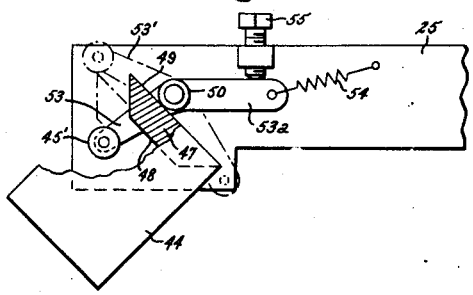
Inventors:
Daniel J. Jones,
Dante E. Piccone,
by Irving H. Marshman
Their Attorney.

United States Patent Office 2,954,444
Patented Sept. 27, 1960

2,954,444
INTERLOCK MECHANISM FOR AN ENCLOSED ELECTRIC SWITCH

Daniel J. Jones, Glenolden, and Dante E. Piccone, Philadelphia, Pa., assignors to General Electric Company, a corporation of New York Filed Sept. 9, 1958, Ser. No. 759,935

11 Claims. (Cl. 200—50)

This invention relates to an interlock mechanism for enclosed electric switches, and more particularly it relates to a mechanism for interlocking an access cover of a sheet metal housing which encloses an electric switch, circuit breaker or the like.

It is common practice in supplying relatively low voltage electric power to large commercial or institutional buildings to employ service equipment at the point of entrance of the service conductors. Service equipment comprises a circuit breaker or a combination of a switch and fuses or other similar electric circuit controlling device intended to serve as a means of cutoff for the power supply to the building. Such a device is ordinarily located in a grounded sheet metal enclosure, and an openable cover or door is provided for convenient access to the interior of the enclosure for the purpose of replacing fuses or carrying out routine maintenance procedures. For safety reasons it is desirable to interlock the access cover with the enclosed device in a manner assuring that the cover cannot be opened unless the device is in an open-circuit condition. Since the service equipment controls the supply of power to the entire building, it is also desirable that the enclosed device be opened as few times as possible during the conduct of a routine maintenance procedure.

Accordingly, a general object of this invention is the provision, for an electric circuit controlling device mounted in an enclosure having an openable access cover, of an improved interlock which in the first instance locks the access cover closed and assures that the enclosed device is in an open-circuit condition whenever the access door is opened, and which in the second instance is designed to be manually defeated thereby permitting closure of the device while the cover is open, the normal cover-locking function of the interlock being automatically restored whenever the cover is closed.

In carrying out our invention in one form an interlock member is provided for an electric circuit controlling device adapted to be located in an enclosure having an openable access cover normally disposed in a closed position. The interlock member is supported for movement between first and second positions, and this member is coordinated with the operating mechanism of the electric device in a manner to prevent movement from its first to its second position whenever the device is closed and to prevent closing the device whenever the interlock member is in its second position. We provide locking means associated with the interlock member and the access cover to prevent opening the cover whenever the interlock member is prevented from moving to its second position and to effect movement of the interlock member to its second position during opening of the cover when such movement is permitted. The interlock member is manually returnable from its second to its first position while the cover is open, and the locking means is arranged automatically to reset upon closing the cover with the interlock member in its first position thereby to prevent subsequent opening of the cover as long as the interlock member is prevented from moving to its second position.

Our invention will be better understood and its various objects and advantages will be more fully appreciated from the following description taken in conjunction with the accompanying drawings in which:

Fig. 1 is a side elevation of an enclosed electric circuit controlling device with the near side of the enclosure broken away to show an interlock mechanism constructed in accordance with a preferred embodiment of our invention—the enclosure device being illustrated in a closed-circuit condition, the access cover of the enclosure being illustrated in a closed position and the interlock member of the mechanism being illustrated in its first or cover-locked position;

Fig. 2 is an enlarged sectional view of the mechanism of Fig. 1 along line 2—2;

Fig. 3 is an enlarged sectional view of the mechanism of Fig. 1 along line 3—3;

Fig. 4 is an enlarged partial side elevation similar to Fig. 1 except illustrating the enclosed device in an open-circuit condition, the access cover in an open position and the interlock member in its second or trip-free position;

Fig. 5 is an enlarged partial side elevation similar to Fig. 1 except illustrating the enclosed device in an open-circuit condition, the access cover open and the interlock member in its original or first position;

Fig. 6 is a side elevation of an interlock mechanism constructed in accordance with another embodiment of our invention; and Fig. 7 is a side elevation of a portion of an interlock mechanism showing still another embodiment of our invention.

Referring now to Fig. 1, the reference number 11 is used to identify generally an electric circuit controlling device. The particular device 11 which has been shown schematically in order to illustrate our invention is a low voltage air circuit breaker of a type fully described in Patent 2,581,181, issued January 1, 1952, to John A. Favre. This circuit breaker comprises cooperating movable and stationary circuit interrupting switch contacts 12 and 13, respectively, suitably supported on the circuit breaker frame. The stationary contact 13 is electrically connected to a line terminal or stud 14 of the breaker and the movable contact 12 is electrically connected to a load terminal or stud 15 of the breaker. The cooperating contacts and studs shown in Fig. 1 comprise one pole unit of a multipole breaker, the other pole units being of similar construction.

Movement of the switch contact 12 to open and close an electric circuit connected to the load stud 15 of the breaker 11 is controlled by an operating mechanism indicated generally by the reference number 16. This mechanism includes a switch arm 17 which carries the movable contact 12 between a closed-circuit position shown in Fig. 1 and an open-circuit position shown in Fig. 4. The movable switch arm 17 is actuated by suitable stored energy closing and tripping springs (not shown), the closing springs being charged and operated by means of appropriate gears and linkages shown in block form at 18.

The operating mechanism 16 for the switch contacts of the circuit breaker also includes a trip shaft 19 movable between a normal position shown in Fig. 1 and a trip-free position shown in Fig. 4. The trip shaft is biased to its normal position by suitable spring means or the like exerting clockwise torque on the shaft. While a trip latch and related linkages of the operating mechanism are not shown, it will be understood that counterclockwise tilting of the shaft 19 against its bias to the position shown in Fig. 4 not only effects opening of the breaker contacts but also results in a trip-free condition wherein the switch arm 17 is prevented from moving to its closed-circuit position upon any subsequently attempted closing operation. The circuit breaker 11 illustrated in the drawings and described briefly above is intended to be representative only, and it will soon be apparent that our invention may be advantageously applied in connection with any electric circuit controlling device or switch having an operating mechanism analogous to the operating mechanism 16 of the present disclosure.

The circuit breaker 11 is adapted for location in a suitable enclosure unit such as the sheet metal housing 20 illustrated in Fig. 1. The enclosure 20 has an openable front cover 21 which provides access to its interior. The access cover 21 is supported for opening movement by suitable hinges (not shown), and it is normally disposed in a closed position in which it is latched by means including a T-shaped handle 22 shown in Fig. 1. An island 23 of the circuit breaker protrudes through a cooperating aperture in the cover 21, and a removable operating handle 24 at the front of the enclosure 20 is coupled to the linkages 18 of the operating mechanism 16 for the purpose of closing the breaker contacts 12 and 13. Separate means (not shown) are provided for actuating the trip shaft 19 thereby to trip the circuit breaker 11.

The enclosure 20 for the circuit breaker 11 may take any form. A set of current-limiting fuses or the like may be located in the same enclosure with the breaker. In any case it is required to prevent opening of the access cover 21 unless the enclosed device is in an open-circuit or deenergized condition. This state of affairs is desired in order to minimize the risk of accidental or inadvertent electric shock and injury to an inexperienced person who might otherwise open the cover and work on the enclosed breaker without appropriate care and precaution. Positive assurance that the enclosed breaker is open before the access door can be opened is obtained in accordance with our invention by an interlock which will now be described in detail.

The interlocking mechanism, as can be seen in Figs. 1 and 2, comprises an elongated interlock member or lever 25 supported for rectilinear and pivotal movement within the enclosure 20. In the preferred embodiment of our invention, the support for the interlock member 25 comprises a pin 26 and a bracket 27 both rigidly affixed to a sidewall 28 of the circuit breaker frame. The support pin 26 projects through a horizontally elongated slot 29 in the interlock member 25 and, in cooperation with the opposite ends of slot 29, determines the front and rear limits of the rectilinear travel of member 25. The pin 26 also provides an axis for pivotal movement of the interlock member. The bracket 27, as is best seen in Fig. 2, is provided with a vertically elongated slot 30, the configuration of slot 30 conforming approximately to the cross section of the member 25. As is clearly indicated in the drawings, the interlock member 25 rides in the slot 30 of supporting bracket 27.

Two rectangular notches 31 and 32 are formed in the lower edge of interlock member 25, and a generally U-shaped notch 33 is formed in its upper edge. The spaced notches 31 and 32 define an intermediate enlarged portion 34 of the member 25. It is apparent that member 25 can move rectilinearly and pivotally from a first or cover-locked position shown in Fig. 1 to a second or trip-free position shown in Fig. 4. That is, the member 25 is supported so that it can slide forward to the left in a horizontal plane from the position shown in Fig. 1 until the rear end of slot 29 reaches support pin 26 at which point the enlarged intermediate portion 34 of the member will have moved out of the slot 30 of bracket 27, whereupon the notch 31 permits counterclockwise pivotal movement of the member 25 to its second position shown in Fig. 4. A suitable tension spring 35 interconnecting the bracket 27 and the member 25 provides a bias which urges member 25 to its first position. Although the structure of the interlock member 25 is such that the force of gravity alone could accomplish this function, the spring 35 is also arranged to hold the interlock member 25 releasably latched in its second position with the forward edge of notch 31 engaging the front of bracket 27 immediately below slot 30. See Fig. 4.

The U-shaped notch 33 in interlock member 25 is in alignment with the slot 30 in bracket 27 with the interlock member in its first position (Figs. 1 and 5). This notch enables the member 25 to be moved pivotally in a clockwise direction with respect to support pin 26 from ist first position to a third or reset position shown by the broken lines 25′ in Fig. 5. As is indicated in Fig. 5, this pivotal movement of the member 25 is limited by the bottom of notch 33 engaging the bracket 27 at the top of slot 30.

The operating mechanism 16 of the enclosed circuit breaker 11 has associated therewith suitable means disposed in cooperative relationship with the interlock member 25 for the purpose of coordinating the condition of the circuit breaker contacts with the movement of the interlock member. In the illustrated embodiment of our invention this interconnecting means comprises a latch member 36 pivotally mounted at 37 on bracket 27. The latch member 36 includes an elongated rod 38 which is slidably disposed in a cooperating slot 39 of a generally L-shaped bracket 40 affixed to the movable switch arm 17 of the circuit breaker. See Figs. 1, 2 and 4. Thus movement of the switch arm 17 from its closed-circuit to its open-circuit position carries the latch member 36 pivotally about 37 in a clockwise direction from the position shown in Fig. 1 to the position shown in Fig. 4. The latch member 36 also includes a transversely protruding lug 41 which, as is clearly shown in Figs. 1 and 2 is in the notch 32 of the interlock member 25 with the latch member in the position shown. In this position lug 41 is disposed in the rectilinear path of movement the intermediate portion 34 of the interlock member 25, and consequently the interlock member is positively prevented from moving from its first to its second position. The lug 41 of latch member 36 is moved out of notch 32 thereby unblocking the interlock member 25 and permitting unrestrained movement thereof whenever the enclosed circuit breaker 11 is in an open-circuit condition (Figs. 4 and 5).

The interconnection between the operating mechanism 16 of the circuit breaker 11 and member 25 of the interlock mechanism includes a generally Z-shaped trip paddle 42 mounted on trip shaft 19 and having an adjusting screw 42a disposed for engagement by a pin 43 protruding from the interlock member 25. As is indicated most clearly in Fig. 4, movement of the interlock member 25 to its second position causes pin 43 to engage trip paddle 42 and tilt the trip shaft 19 in a counterclockwise direction to its trip-free position. In its trip-free position the trip shaft 19 will maintain the circuit breaker 11 open and prevent movement of the switch arm 17 to its closed-circuit position. Thus the circuit breaker cannot be closed as long as the interlock member is in its second or trip-free position.

In order to control the opening movement of the access cover 21, we provide locking means comprising a pair of mutually engageable elements 44 and 45 respectively associated with the cover and the interlock member 25. The locking element 44 is mounted on an upstanding member 46 which is welded or bolted to the inside surface of the cover 21 and projects inside the enclosure 20. In the preferred embodiment of the invention, the element 44 comprises a generally L-shaped piece one leg 47 of which extends transversely to the direction of movement of the cover 21. The leg 47 of element 44 is a cam having two different but parallel camming surfaces 48 and 49 on opposite sides thereof, and the element 44 is mounted so that these camming surfaces are inclined at an angle of approximately 45 degrees with respect to horizontal. As is best seen in Figs. 1 and 3, complementary edges 47a and 47b of the cam 47 are beveled at 45 degrees so that edge 47a is disposed in a horizontal plane and edge 47b is disposed in a vertical plane.

The second locking element 45 in the Figs. 1–5 embodiments of our invention comprises a pin protruding transversely from the front portion of the interlock member 25 adjacent the access cover 21. The pin 45 is normally disposed adjacent the camming surface 48 of the cooperating element 44, and consequently, as is best seen in Fig. 1, the pin 45 is between cover 21 and the element 44 mounted on the upstanding member 46 of the cover. Upon attempting to open the access cover 21, the locking element 44 is moved forward (to the left in Fig. 1), and camming surface 48 of this element engages the locking element 45. As long as the interlock member 25 is prevented from moving to its second position by the action of lug 41 of latch member 36, the locking element 45 remains stationary and the cover 21 is locked closed. However, should the circuit breaker 11 be in an open-circuit condition and the interlock member 25 consequently unblocked, camming surface 48 acting through element 45 will pull the interlock member forward and then move it pivotally counterclockwise to effect movement of 25 to its second position (Fig. 4) during opening of the cover. The interlock member 25 reaches its second position when the locking element 45 has been cammed by the cooperating surface 48 to a position below the beveled edge 47a of element 44, and consequently the access cover 21 is now free to move to a fully open position. The rectilinear and arcuate path of movement of the locking element 45 during the initial opening movement of the access cover 21, when such movement is permitted, is illustrated in Fig. 4 by the broken line identified by the reference letter P.

In order to permit routine maintenance of the enclosed circuit breaker 11, including the visual inspection of the breaker switch contacts opening and closing, it is necessary to permit operation of the breaker with the access door 21 open. Accordingly, our interlock is designed to be deliberately defeated with the cover open, that is its automatic interlocking function of maintaining the enclosed breaker in an open condition whenever the access cover is open can be defeated by a conscious manual act on the part of a maintenance man or operator. This result is obtained because the interlock member 25, as is apparent in Figs. 4 and 5, is manually releasable and returnable from its second position (Fig. 4) to its first position (Fig. 5) while the cover is open. All that is required is for the operator to reach into the enclosure 20 and lift the front end of member 25 until its enlarged portion 34 clears the supporting bracket 27 at the bottom of slot 30. The interlock member 25 when returned to its first position will remain therein without any further action on the part of the operator, and the circuit breaker 11 can be closed at will.

In one application contemplated for our invention, it is desirable to reduce to a minimum the number of times the enclosed breaker 11 is opened during a maintenance procedure. Toward this end, the interlock is arranged so that the breaker when closed after defeating the interlock will remain closed upon subsequent closure of the access cover 21. At the same time, the interlock mechanism will reset and its normal cover-locking function will be automatically restored upon such subsequent closing of the cover. In order to accomplish this desired result, the locking element 45 associated with the interlock member 25 and the camming surface 49 of the locking element 44 associated with the cover 21 are disposed for engagement and relative movement without rectilinear movement of the member 25 upon closing the cover with the interlock member in its first or cover-locked position. This relative movement of the elements 44 and 45 enables element 45 to resume its normal disposition adjacent camming surface 48 of element 44, whereby the locking means is reset and the normal cover-locking function of the mechanism is automatically restored.

In the preferred embodiment of our invention the interlock member 25 is supported for clockwise pivotal movement from the first solid-line position shown in Fig. 5 to the third or reset position 25'. When the access cover 21 is being closed, the pin-like element 45 of member 25 engages and slides up the inclined camming surface 49 of element 44, and consequently these cooperating elements are effective to move the member 25 from its first position to its third position from which it returns to its first position as the beveled edge 47b of element 44 moves beyond element 45. The interlock member 25 is urged back to its first position by the action of bias spring 35, but it would return thereto under the influence of gravity alone in the absence of the spring.

Whenever the access cover 21 of the enclosure 20 is closed while the interlock member 25 is still in its second or trip-free position (Fig. 4), the interlock mechanism is arranged automatically to reset. This is accomplished by providing a third element 50 associated with the front portion of the interlock member 25 in spaced-apart relation to element 45. The element 50 is a transversely projecting pin disposed for cooperative engagement by the camming surface 49 of element 44. As is apparent in Fig. 4, element 50 will be engaged by the camming portion 47 of element 44 upon closing the cover 21 with the interlock member 25 in its second position thereby lifting the front end of member 25 and releasing the member for return to its first or original position shown in phantom in this figure. This action enables the spaced-apart pins 45 and 50 to resume their normal dispositions on opposite sides of the camming portion 47, as shown in Fig. 1.

In the embodiment of our invention illustrated in Fig. 6, an alternative arrangement is shown wherein the third element, in lieu of pin 50 mounted on the interlock member 25, comprises a lug 50' associated with the access cover 21 and having an inclined camming surface disposed in parallel, spaced-apart relation to the camming surface 48 of the element 44. Upon closing the access cover 21 with the interlock member 25 releasably latched in its second position, the lower portion of the camming surface of element 50' will engage the cooperating pin-like element 45 of the interlock member 25 thereby releasing the interlock member 25 for return to its first position.

In Fig. 6 an alternative means for supporting the interlock member 25 is also illustrated. Instead of notches 31 and 33 the interlock member 25 is provided with a zigzag slot 51. The slotted bracket 27 is omitted and replaced by a plate 27' having affixed thereto a pin 52 which extends through the slot 51 in member 25. In this manner the interlock member 25 is supported and guided for rectilinear and pivotal movement to each of its three different positions already described.

From the foregoing detailed description of the structure of our interlock mechanism, its mode of operation may now be readily followed. The interlock member 25 is normally in a cover-locked position shown in Fig. 1, and it is prevented from moving forward from this position as long as the switch arm 17 of the circuit breaker 11 is in its closed-circuit position, such forward movement being blocked by latch member 36 whose lug 41 is disposed adjacent the trailing edge of notch 32 in the interlock member 25. Under these conditions, the cooperating locking elements 44 and 45 are disposed in interfering relationship with each other and consequently the access cover 21 of the enclosure 20 cannot be opened.

Whenever the switch arm 17 of the circuit breaker 11 is in its open-circuit position (Fig. 4), the latch member 36 is moved so that lug 41 has dropped below notch 32 and consequently forward movement of the interlock member 25 is now permitted. A maintenance man can now unlatch and open the access cover 21. During opening movement of cover 21 the camming surface 48 of locking element 44 engages the cooperating locking element 45 thereby causing rectilinear forward movement of the interlock member 25 until the intermediate enlarged portion 34 thereof passes beyond slot 30 in bracket 27. At this point the rectilinear movement of the member 25 is stopped by support pin 26 and the interlock member is cammed pivotally to its second or trip-free position shown in Fig. 4. During this pivotal movement of member 25, the pin-like locking element 45 slides down the camming surface 48 and to a position below the beveled edge 47a of the cooperating locking element 44, whereupon the access cover 21 is freed for full opening movement. Due to the action of the bias spring 35 (or due to gravity alone) the interlock member 25 is releasably latched in its trip-free position with the notch 31 straddling the supporting bracket 27 at the bottom of slot 30. The above-described rectilinear and pivotal movement of the interlock member from its first to its second positions is effective through the action of pin 43 and trip paddle 42 to actuate the trip shaft 19 of the circuit breaker 11 to its trip-free position wherein the breaker contacts can not be closed.

The interlock member 25 is returned from its trip-free position to its cover-locked position when the access cover 21 is closed by the action of the cooperating elements 44 and 50 (or 45 and 50' in the Fig. 6 embodiment of our invention). While closing the cover 21, one of these two elements engages and rides up the camming surface of the other element thereby releasing the interlock member 25 from its trip-free position. The member 25 is returned to its cover-locked position by the action of bias spring 35, but even in the absence of the bias spring the interlock member would be moved rectilinearly to its cover-locked position by the action of the engaged elements of the interlock mechanism. The interlock mechanism is now reset and will positively prevent opening of the access cover 21 any time the enclosed circuit breaker 11 is in a closed-circuit condition.

When it is desired to close the circuit breaker 11 with the access cover 21 open, the interlock member 25 is released from its second or trip-free position (Fig. 4) for return to its original position by manually lifting its front end. The interlock member 25 will remain in its original position (Fig. 5), and the circuit breaker 11, whose trip shaft 19 has returned to its normal position, can now be closed. Upon closing the access cover 21 after this deliberate defeat of the interlock, the camming surface 49 of the locking element 44 engages element 45 which moves relative to the element 44 as the interlock member 25 is pivoted clockwise on support pin 26 thereby enabling the element 45 to ride over the top of the camming portion 47 of element 44, whereupon the interlock member 25 returns to its original position with the locking element 45 disposed adjacent the camming surface 48 of the cooperating element 44. This automatic resetting action restores the cover-locking function of the interlock without necessitating another opening operation of the enclosed circuit breaker 11. Subsequent opening of the access cover 21 is prevented in the manner previously described.

In the Fig. 7 embodiment of our invention the relative movement between the cooperating locking elements during the automatic resetting of the interlock mechanism following its defeat is accomplished without pivotal movement of the interlock member 25 to a third or reset position. As is clearly shown in Fig. 7, the pin-like locking element 45' is not rigidly affixed to the interlock member 25 but instead is pivotally connected to the pin-like element 50 by means of a link 53. A tension spring 54 is provided to bias an integral part 53a of link 53 into abutting engagement with a stop bolt 55 which is secured to the interlock member 25. Thus the locking element 45' is maintained normally in the position shown in Fig. 7 from which it can move pivotally with respect to element 50 in a clockwise direction only. The cover locking function of this embodiment is obtained in a manner identical to that already described in connection with Figs. 1–6. It will be observed that the force applied to element 45' when engaged by camming surface 48 of the cooperating element 44 during opening of the access cover 21 is in a direction creating a counterclockwise torque in link 53 with respect to element 50, and therefore there can be no relative movement between element 45' and the interlock member 25 at this time.

The interlocking mechanism of the Fig. 7 embodiment can be defeated while the access cover is open in the manner previously described. Upon subsequently closing the cover, camming surface 49 of element 44 engages the element 45' and there will be relative movement therebetween as the link 53 pivots clockwise on element 50. The element 45' in effect slides up the camming surfaces 49 to the position shown by broken lines (53') in Fig. 7, whereupon the element 45' drops behind the camming portion 47 of element 44 to its normal position adjacent the camming surface 48, and the coverlocking function of the interlock is now restored. This automatic resetting action is accomplished without any movement on the part of the interlock member 25, and consequently the generally U-shaped notch 33 can be omitted from this member.

While we have shown and described several forms of our invention by way of illustration, other modifications will occur to those skilled in the art. For example, the pin-like elements 45 and 50 of the interlock mechanism shown in Fig. 1 could be mounted on the upstanding member 46 of the access cover 21, with the cooperating element 44 and its camming surfaces 48 and 49 being associated with the interlock member 25. We contemplate, therefore, by the concluding claims to cover all such modifications as fall within the true spirit and scope of our invention.

What we claim as new and desire to secure by Letters Patent of the United States is:

1. In an electric circuit controlling device having an operating mechanism including a switch arm movable between closed-circuit and open-circuit positions, the electric device being adapted to be located in an enclosure having a normally closed cover disposed for opening movement to provide access to the interior of the enclosure: an interlock member disposed in cooperation with the operating mechanism of the electric device and the enclosure cover for movement between first and second positions, movement by the interlock member from its first to its second position being prevented whenever said switch arm is in its closed-circuit position and movement of said switch arm from its open-circuit to its closed-circuit position being prevented whenever the interlock member is in its second position; and locking means associated with the interlock member and the cover to prevent opening the cover whenever the interlock member is in its first position and is prevented from moving to its second position and to effect movement of the interlock member to its second position upon opening movement of the cover when such movement is permitted; said interlock member being manually returnable from its second to its first position while the cover is open and said locking means being arranged automatically to reset upon closure of the cover with the interlock member in its first position in order to prevent subsequent opening of the cover as long as the interlock member is prevented from moving from its first to its second position.

2. An interlock for an electric circuit controlling device having an operating mechanism including a switch arm movable between closed-circuit and open-circuit positions, the electric device being adapted for mounting in an enclosure having a normally closed cover disposed for opening movement to provide access to the interior thereof, comprising: an interlock member supported adjacent the cover for movement between first and second positions; means associated with the operating mechanism of said device and disposed in cooperating relationship with the interlock member to prevent movement of the interlock member from its first to its second position whenever said switch arm is in its closed-circuit position and to prevent movement of said switch arm to its closed-circuit position whenever the interlock member is in its second position; and a pair of mutually engageable locking elements respectively associated with the interlock member and the cover with one of the elements being normally disposed adjacent one side of the other element for engagement therewith to prevent opening the cover as long as the interlock member is prevented from moving from its first to its second position; said interlock member being moved to its second position during the opening of the cover when permitted and being manually returnable from its second to its first position while the cover is open; said one locking element and an opposite side of said other locking element being disposed for engagement and relative movement upon subsequent closure of the cover in order to enable said elements to resume their normal disposition wherein the one element is adjacent said one side of the other element.

3. In an interlock for an electric circuit controlling device having an operating mechanism including a trip shaft movable between normal and trip-free positions, the electric device being adapted to be located in an enclosure having a normally closed cover disposed for opening movement to provide access to the interior thereof: an interlock member supported adjacent the cover for movement between first and second positions; means associated with the operating mechanism of said device and disposed in cooperating relationship with the interlock member to actuate said trip shaft to its trip-free position during movement of the interlock member from its first to its second position; and a pair of mutually engageable elements respectively associated with the interlock member and the cover, a first element of said pair having two different camming surfaces and the second element of said pair being normally disposed adjacent one of said camming surfaces for engagement therewith to move the interlock member to its second position upon opening of the cover; said interlock member being releasably latched in its second position from which it is manually returnable to its first position while the cover is open, said second element and the other camming surface of said first element being disposed for engagement and relative movement upon closure of the cover with the interlock member in its first position in order to permit said elements to resume their normal disposition wherein the second element is adjacent said one camming surface of the first element.

4. In an interlock mechanism for an electric circuit controlling device having an operating mechanism including a switch arm movable between closed-circuit and open-circuit positions, the electric device being adapted for mounting in an enclosure having a normally closed cover disposed for opening movement to provide access to the interior thereof: an upstanding member adapted to be mounted on the inside of the enclosure cover; an interlock member supported within the enclosure for movement between first and second positions; means associated with the operating mechanism of said device and disposed in cooperating relationship with the interlock member to prevent movement of the interlock member from its first to its second position whenever said switch arm is in its closed-circuit position and to prevent movement of said switch arm to its closed-circuit position whenever the interlock member is in its second position; a pair of mutually engageable locking elements respectively associated with the interlock member and the upstanding member, a first element of said pair having two different camming surfaces and the second element of said pair being normally disposed adjacent one of said camming surfaces for engagement therewith to prevent opening the cover as long as the interlock member is prevented from moving from its first to its second position and to move the interlock member to its second position during opening of the cover when such movement is permitted; said interlock member being manually returnable from its second to its first position while the cover is open, said second element and the other camming surface of said first element being disposed for engagement and relative movement upon subsequent closure of the cover in order to enable said elements to resume their normal disposition wherein the second element is adjacent said one camming surface of the first element; and a third element associated with one of said members and disposed for cooperative engagement by the one of said pair of elements associated with the other member in order to return the interlock member to its first position upon closing the cover while the interlock member is still in its second position.

5. In an enclosure for an electric circuit controlling device having an operating mechanism including a trip shaft movable between normal and trip-free positions; a normally closed cover disposed for opening movement with respect to the enclosure to provide access to the interior thereof; an upstanding member mounted on the inside of the cover; an interlock member supported within the enclosure adjacent the electric device and the cover for movement between first and second positions; means associated with the operating mechanism of said device and disposed in cooperating relationship with the interlock member to actuate said trip shaft to its trip-free position during movement of the interlock member from its first to its second position; a pair of mutually engageable elements respectively associated with the interlock member and the upstanding member, a first element of said pair having two different camming surfaces and the second element of said pair being normally disposed adjacent one of said camming surfaces for engagement therewith to move the interlock member to its second position upon opening of the cover; said interlock member being releasably latched in its second position from which it is manually returnable to its first position while the cover is open, said second element and the other camming surface of said first element being disposed for engagement and relative movement upon closure of the cover with the interlock member in its first position in order to permit the second element to resume its normal disposition adjacent said one camming surface of the first element; and a third element associated with one of said members and disposed for cooperative engagement by the one of said pair of elements associated with the other member to release the interlock member and return it to its first position upon closing the cover while the interlock member is still in its second position.

6. In an enclosure for an electric circuit controlling device having an operating mechanism including a switch member movable between closed-circuit and open-circuit positions and a trip shaft movable between normal and trip-free positions; an openable access cover normally disposed in a closed position with respect to the enclosure; an interlock member supported within the enclosure adjacent the electric device and the cover for movement between a cover-locked position and a trip-free position; means associated with the operating mechanism of said device and disposed in cooperating relationship with the interlock member to prevent movement of the interlock member from its cover-locked to its trip-free position whenever said switch arm is in its closed-circuit position and to actuate said trip shaft to its trip-free position during movement of the interlock member to its trip-free position; and a pair of mutually engageable elements respectively associated with the interlock member and the cover, a first element of said pair having two camming surfaces and the second element of said pair being disposed adjacent one of said camming surfaces for engagement therewith to lock the cover in its closed position when the interlock member is prevented from moving from its cover-locked to its trip-free position and to move the interlock member to its trip-free position during opening movement of the cover when such movement is permitted; said interlock member being manually returnable from its trip-free position to its cover-locked position while the cover is open, said second element and the other camming surface of said first element being disposed for engagement and relative movement upon closure of the cover with the interlock member in its cover-locked position in order to permit said elements to resume their cover-locked disposition wherein the second element is adjacent said one camming surface of the first element.

7. In combination: an enclosure unit having an openable access cover normally disposed in a closed position with respect to the enclosure unit; an upstanding member mounted on the cover and projecting inside the unit; an electric circuit controlling device disposed within the enclosure unit and having an operating mechanism including a switch arm movable between closed-circuit and open-circuit positions and a trip shaft movable between normal and trip-free positions; an interlock member supported within the enclosure unit for rectilinear and pivotal movement between first and second positions; means associated with the operating mechanism of the electric device and disposed in cooperating relationship with the interlock member to prevent movement of the interlock member from its first to its second position whenever said switch arm is in its closed-circuit position and to actuate said trip shaft to its trip-free position during movement of the interlock member to its second position; a pair of mutually engageable locking elements respectively associated with the interlock member and the upstanding member, the first element of said pair having two inclined camming surfaces and the second element of said pair being normally disposed adjacent one of said camming surfaces for engagement therewith to prevent opening the cover as long as the interlock member is prevented from moving from its first to its second position and to move the interlock member to its second position during opening of the cover when such movement is permitted; said interlock member being releasably latched in its second position from which it is manually returnable to its first position while the cover is open, said second element and the other camming surface of said first element being disposed for engagement and relative movement without rectilinear movement of the interlock member upon closure of the cover with the interlock member in its first position in order to permit the second element to resume its normal disposition adjacent said one camming surface of the first element; and a third element associated with one of said members and disposed for cooperative engagement by the one of said pair of elements that is associated with the other member for returning the interlock member to its first position upon closing the cover with the interlock member in its second position.

8. In an electric circuit controlling switch having an operating mechanism including a switch arm disposed for movement between closed-circuit and open-circuit positions, the switch being adapted to be located in an enclosure having a normally closed cover disposed for opening movement to provide access to the interior thereof: an interlock member supported for movement from a first position to either of two other positions; means associated with the operating mechanism of the switch and disposed in cooperation with the interlock member to prevent movement of the interlock member from its first to a second position whenever said switch arm is in its closed-circuit position and to prevent movement of the switch arm to its closed-circuit position whenever the interlock member is in its second position; and a pair of mutually engageable locking elements respectively associated with the interlock member and the enclosure cover, one of the elements being normally disposed adjacent one side of the other element for engagement therewith to prevent opening the cover as long as the interlock member is prevented from moving from its first to its second position; said interlock member being moved to its second position during opening of the cover when permitted and being manually returnable from its second to its first position while the cover is open; said one locking element in cooperation with an opposite side of said other locking element being effective upon subsequent closure of the cover to move the interlock member from its first position to a third position from which it returns to said first position in order to permit the one element to resume its normal disposition adjacent said one side of the other element.

9. In combination: an electric circuit controlling switch having an operating mechanism including a switch arm movable between closed-circuit and open-circuit positions and a trip shaft movable between normal and trip-free positions, the switch being adapted to be disposed within an enclosure unit including an access cover movable from a normally closed position to an open position, the cover having an upstanding member mounted thereon; an interlock member supported within the enclosure unit for movement to each of three different positions; means associated with the operating mechanism of said switch and disposed in cooperating relationship with the interlock member to prevent movement of the interlock member from a first one of its three positions to a second of its three positions whenever said switch arm is in its closed-circuit position and to actuate said trip shaft to its trip-free position during movement of the interlock member to its second position; a pair of mutually engageable elements respectively associated with said interlock member and the upstanding member mounted on the access cover, a first element of said pair having generally parallel camming surfaces and the second element of said pair being disposed adjacent one of said camming surfaces for engagement therewith to prevent opening the cover as long as the interlock member is prevented from moving from its first to its second position and to move the interlock member to its second position during opening of the cover when such movement is permitted; said interlock member being manually returnable from its second to its first position while the cover is open, said second element and the other camming surface of said first element being disposed for engagement and relative movement upon subsequent closure of the cover thereby to move the interlock member from its first position to the third one of its three positions from which it returns to said first position in order to enable said elements to resume their relative disposition wherein the second element is adjacent said one camming surface of the first element; and a third element associated with one of said members and disposed for cooperative engagement by the one of said pair of elements that is associated with the other member to return the interlock member to its first position upon closing the cover with the interlock member still in its second position.

10. In combination: an enclosure unit having an openable access cover normally disposed in a closed position; an upstanding member mounted on the cover and projecting inside the enclosure unit; an electric circuit breaker disposed within the enclosure unit and having an operating mechanism including a switch arm movable between closed-circuit and open-circuit positions and a trip shaft movable between normal and trip-free positions; an interlock member supported within the enclosure unit for movement from a cover-locked position to trip-free or reset positions, alternatively, said interlock member being biased to its cover-locked position and being releasably latched in its trip-free positions; means associated with the operating mechanism of the circuit breaker and disposed in cooperating relationship with the interlock member to prevent movement of the interlock member from its cover-locked to its trip-free position whenever said switch arm is in its closed-circuit position and to actuate said trip shaft to its trip-free position during movement of the interlock member to its trip-free position; a pair of mutually engageable locking elements respectively associated with the interlock member and the upstanding member, a first element of said pair having two inclined camming surfaces and the second element of said pair being disposed adjacent one of said camming surfaces for engagement therewith to prevent opening the cover as long as the interlock member is prevented from moving its cover-locked to its trip-free position and to move the interlock member to its trip-free position during opening of the cover when such movement is permitted; said interlock member in its trip-free position being manually releasable for return to its cover-locked position while the cover is open, said second element and the other camming surface of said first element being disposed for engagement and relative movement upon closure of the cover with the interlock member in its cover-locked position to move the interlock member to its reset position for return to its cover-locked position thereby enabling said locking elements to resume their cover-locked disposition wherein the second element is adjacent said one camming surface of the first element; and a third element associated with one of said members disposed for cooperative engagement by the one of said pair of locking elements associated with the other member to release the interlock member for return to its cover-locked position upon closing the cover with the interlock member in its trip-free position.

11. In combination: an electric circuit breaker having an operating mechanism including a switch arm movable between closed-circuit and open-circuit positions and a trip shaft movable between normal and trip-free positions, the breaker being adapted to be located in an enclosure unit having an openable access cover normally disposed in a closed position; an upstanding member having a camming element adapted for mounting on the inside of the access cover; an elongated interlock member supported within the enclosure unit for rectilinear and pivotal movement between first and second positions and for pivotal movement between said first position and a third position, said interlock member being releasably latched in its second position; means associated with the operating mechanism of the circuit breaker and disposed in cooperating relationship with the interlock member to prevent movement of the interlock member from its first to its second position whenever said switch arm is in its closed-circuit position and to actuate said trip shaft to its trip-free position during movement of the interlock member to its second position; said interlock member including first and second spaced-apart pin-like elements disposed, respectively, on opposite sides of the camming element with the access cover in its closed position and the interlock member in its first position, said first element cooperating with one side of said camming element to prevent opening of the cover as long as the interlock member is prevented from moving to its second position and to move the interlock member to its second position during opening of the cover when such movement is permitted; the interlock member in its second position being manually releasable and returnable to its first position while the cover is open and said first element cooperating with the opposite side of said camming element being effective upon subsequent closure of the cover to move the interlock member to its third position from which it returns to its first position thereby enabling said first and second elements to resume their positions on opposite sides of the camming element; said second element of the interlock member being disposed in cooperation with said opposite side of the camming element to return the lever to its first position upon closing the cover with the interlock member in its second position.

References Cited in the file of this patent

UNITED STATES PATENTS

| | | |
|---|---|---|
| 2,595,102 | Santangelo | Apr. 29, 1952 |
| 2,698,361 | Mekelburg | Dec. 28, 1954 |
| 2,849,556 | Bank | Aug. 26, 1958 |